United States Patent [19]

Henry

[11] 3,904,825

[45] Sept. 9, 1975

[54] AUTOMATIC TELEPHONE ANSWERING DEVICE WITH MECHANICAL DRIVE CONTROL OF INDEX TIMING

[76] Inventor: Edward F. Henry, P. O. Box 1915, Winter Park, Fla. 32789

[22] Filed: Mar. 14, 1973

[21] Appl. No.: 341,242

Related U.S. Application Data

[63] Continuation-in-part of Ser. No. 56,848, July 21, 1970, abandoned.

[52] U.S. Cl. ................................ 179/6 AC; 179/6 R

[51] Int. Cl. ............................................ H04m 1/64

[58] Field of Search .......... 179/6 AC, 6 R, 1 C, 2 C

[56] References Cited

UNITED STATES PATENTS

| | | | |
|---|---|---|---|
| 1,778,980 | 10/1930 | McKeldin et al. | 179/6 AC |
| 2,058,096 | 10/1936 | Neumann | 179/6 R |
| 2,147,820 | 2/1934 | Milde | 179/6 R |
| 2,790,028 | 4/1959 | Muller et al. | 179/6 R |
| 2,996,948 | 8/1961 | Beachell | 179/100.2 MP |
| 3,135,831 | 6/1964 | Youtie | 179/6 AC |
| 3,319,003 | 5/1967 | Prager | 179/6 AC |
| 3,466,396 | 9/1969 | Guimond | 179/6 AC |
| 3,492,427 | 1/1970 | Foster | 179/6 AC |

*Primary Examiner*—Raymond F. Cardillo, Jr.
*Attorney, Agent, or Firm*—Duckworth, Hobby & Allen

[57] ABSTRACT

A telephone answering device of the type adapted for use with a telephone instrument having a receiver and a hand set, includes a rotatable cam and an endless belt of a recording medium. A magnetic head is included for playing back information recorded on the belt into the hand set, and a drive mechanism is included rotatable with the cam for driving the recording belt past the playback head. The length of the recording belt corresponds to a predetermined portion of the periphery of the cam, such that rotation of the predetermined portion of the cam causes a complete cycle of the belt past the playback head.

15 Claims, 15 Drawing Figures

AUTOMATIC TELEPHONE ANSWERING DEVICE WITH MECHANICAL DRIVE CONTROL OF INDEX TIMING

This application is a Continuation in part application of Application Ser. No. 56,848 filed July 21, 1970 now abandoned.

BACKGROUND OF THE INVENTION

1. Field of the Invention

This invention relates to a telephone answering device utilizing mechanical means for controlling the playing of a recording medium, and more particularly to a device that can be placed upon a telephone receiver and operate when the telephone rings to answer the telephone, deliver a brief pre-recorded message to the caller, optionally provide means to record a message from the caller, and then hang up.

2. Description of the Prior Art

In the past, automatic telephone answering devices have been proposed which are designed to play back a message to the caller. Other devices are designed to also allow the caller to record a message. Because of the complexity of such devices, they are relatively expensive and thus have found a limited market.

This expense in such system is due to designs requiring electrical or electronic means for synchronizing the various functional component portions of the device. For example, many answering devices utilize an electronic detection arrangement in order to locate a cueing spot on the tape, which cueing spot is used to key various device functions, such as tape re-wind, for example. In this regard, see U.S. Pat. No. 3,466,396 to Guimond.

Other prior art answering devices are electrically coupled to the telephone and depend upon electrical signalling to control device operation. Still other answering devices which may or may not employ electrical connections to the telephone circuitry, but due to their design, are very complicated to operate and necessitate simultaneous or sequential operation of a large number of electrical and mechanical controls, switches, and so forth.

Other prior art telephone answering devices include mechanical arrangements for initially answering the telephone and energizing an independent tape recorder to playback message on the tape recorder into the telephone, and thereafter switch the independent tape record into a "record" mode allowing the caller to record a message thereon. See for example, U.S. Pat. No. 3,135,831 to Youtie.

Various other telephone answering device techniques and related structures are taught in the following U.S. Pat. Nos.: 2,996,948 to Beachell; 2,058,096 to Neumann; 2,147,820 to Milde; 3,319,003 to Prager; and 3,492,427 to Foster.

SUMMARY OF THE INVENTION

The present invention contemplates record and playback apparatus comprising a recording medium, means for recording and playing back information on the recording medium, means for driving the recording medium past the recording and playing back means. The apparatus further includes mechanical means for initiating and stopping the drive means and the record-playback means, and means for over-riding the mechanical means to initiate the drive means, and further initiate the record-playback means to record other information on the recording medium.

More specifically, the record and playback apparatus of the present invention is useful as a telephone answering device of the type adapted for use with a telephone instrument having a receiver and hand set, in which the device includes therewith a rotatable cam, or central timing gear, an endless belt of a recording medium, and means for playing back information recorded on the belt. Means are also included which are rotatable with the cam for driving the recording belt past the playback means. More specifically the length of the belt corresponds to a predetermined portion of the periphery of the cam, such that rotation of the predetermined portion of the cam causes a complete cycle of the belt past the playback means, allowing a prerecorded message to be preset for playback on a subsequent call. In a preferred embodiment, the endless recording belt moves through one complete cycle for each complete rotation of the cam, and the cam includes means for starting and stopping operation of the driving means at a point corresponding to the beginning of each cycle of the endless belt.

THE DRAWING

Figure 12:
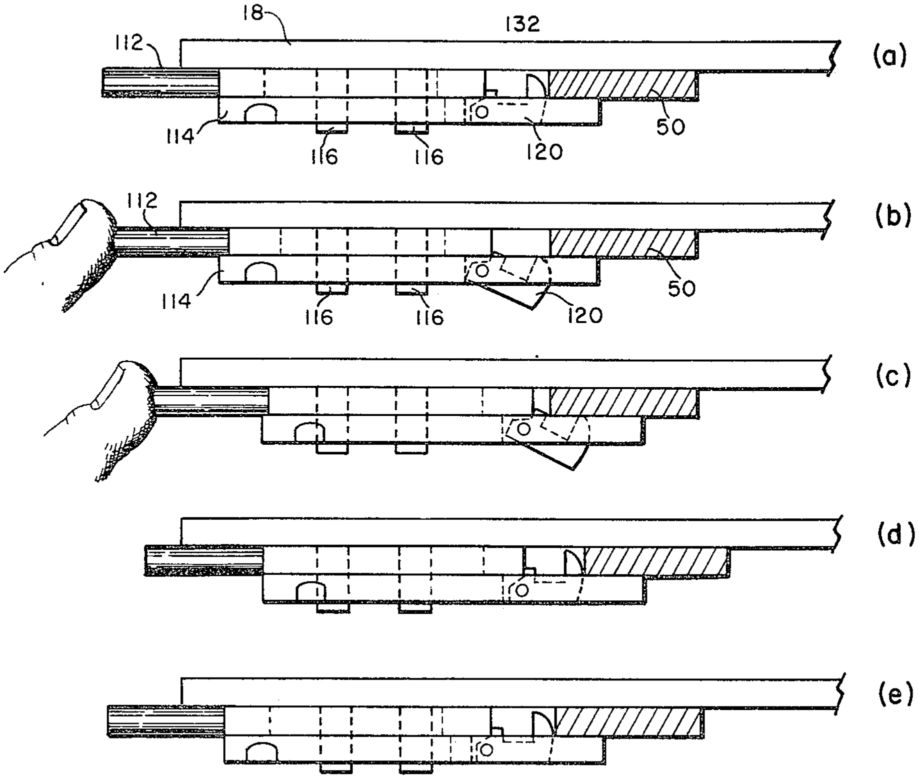
Figures 13, 13A:
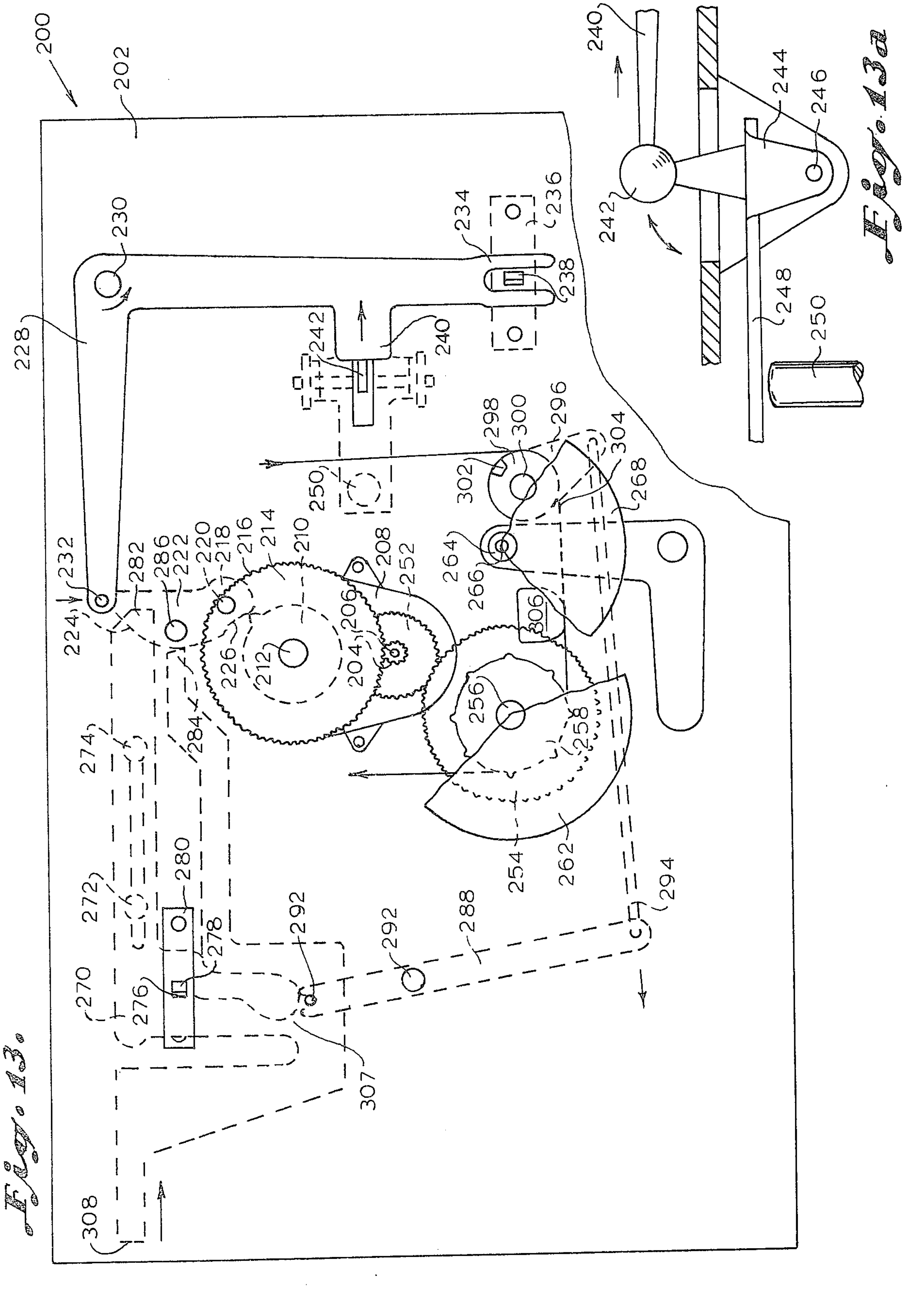

FIGS. 12*a* through 12*e* are a related sequence of views showing the step by step operation of the record assembly; and FIGS. 13 and 13*a* are top plan and side views, respectively, of another embodiment of the present invention.

DETAILED DESCRIPTION

Figures 1, 2:
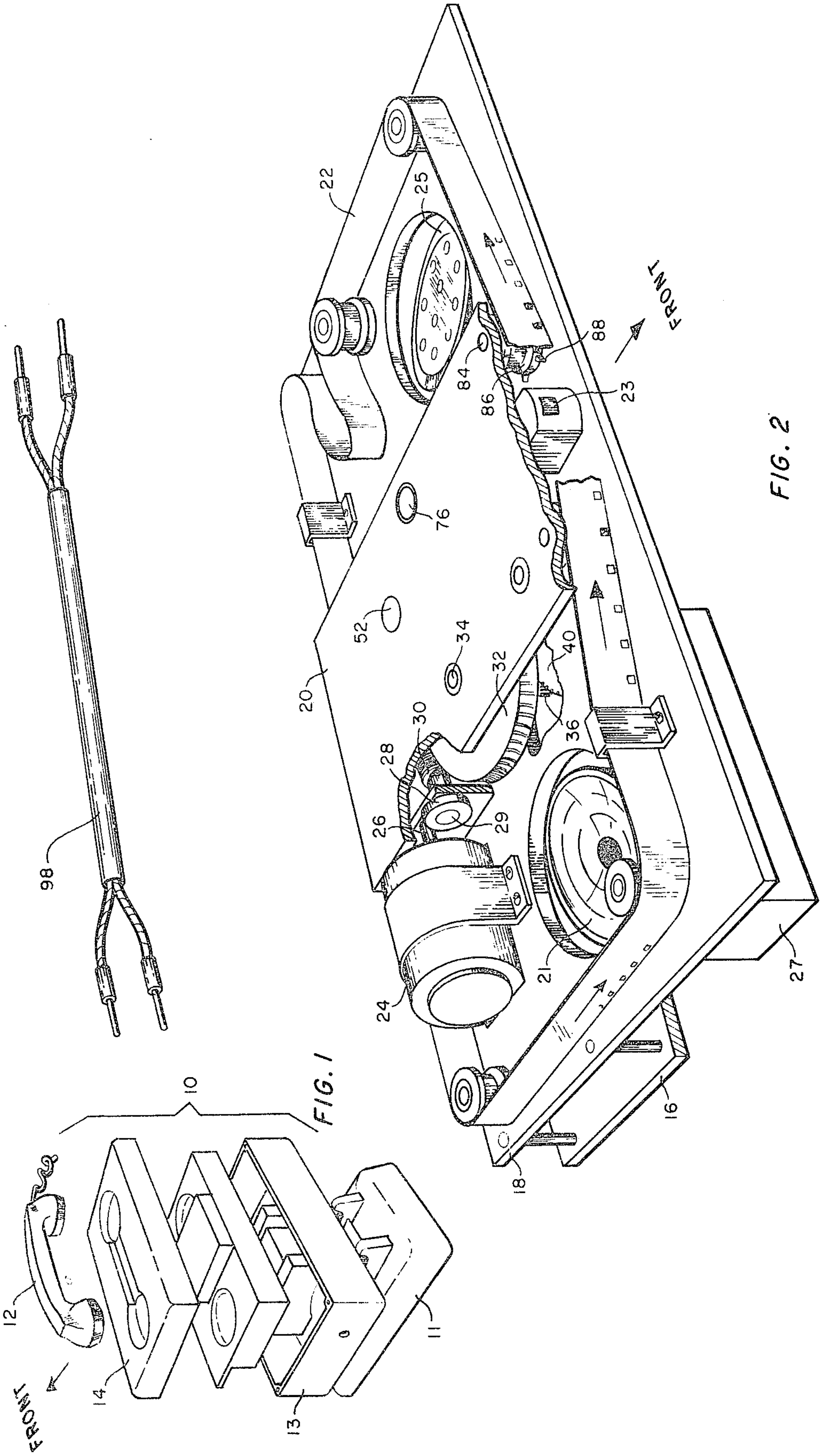
FIG. 1 is an exploded view to a small scale of the principal components of the telephone answering device illustrating how the device relates to the telephone, and to the optional auxiliary recorder.
FIG. 2 is a perspective view of the answering device to a larger scale, having its cover removed and portions cut away to reveal some of the significant portions of the device.

FIG. 1 shows in exploded relation the various principal components of an automatic telephone answering device 10 in accordance with the present invention. The device 10 is adapted to be placed upon a telephone receiver 11, and thereafter the telephone hand set 12 is placed upon an upper cradle portion of the device 10.

Directly on top of the telephone receiver 11 is the bottom of the cover member 13 of the answering device 10. The underside of the cover 13 is configured to fit closely upon the contours of the telephone receiver, the upper side of which is arranged to receive the principal components of the automatic answering device. The assembly is completed by the top 14 of the cover 13, which interfits with the bottom of the cover in such a manner as to completely enclose the answering device 10; with the top of the cover additionally being configured on its upper surface to receive the telephone handset 12. FIG. 1 also shows a cable 98 which will be discussed later.

Figure 3:
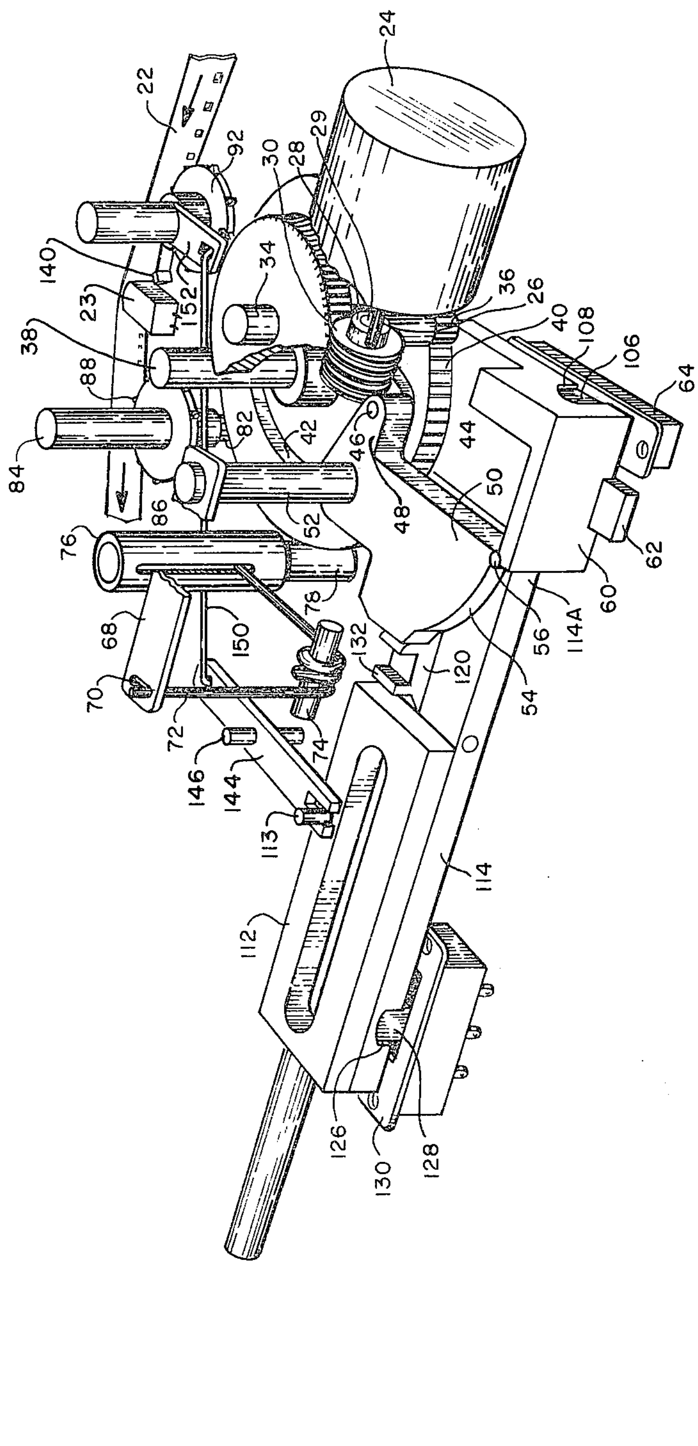
FIG. 3 is a perspective view with the mounting plates removed to reveal mechanical portions of the device.

Referring now to FIGS. 2 and 3, it will be seen that these are perspective views of the principal mechanical components of telephone answering device 10, with portions of these views being broken away so that the internal construction will be revealed. In FIG. 2 as well as in FIG. 5, the components of the answering device principally comprise the lower plate 16, the central plate 18, and the upper plate 20, with an endless magnetic tape 22 for containing the message being loosely arrayed across the upper surface of the central plate. The tape 22, which may be ordinary cellulose-acetate 8-mm movie film coated on one side with ferrous oxide, is equipped with small, spaced perforations so that it can be positively driven by an appropriate sprocket arrangement.

FIG. 2 also shows the speaker 21 and microphone 25 which are located below the central plate 18, directly under large holes in the plate. These holes allow the transmission of voices to and from the microphone and speaker and the telephone handset, through adjacent holes in the top 14 of the cover. Also shown in FIG. 2 is an audio amplifier 27.

The figures illustrate in some degree of detail the motor 24, mounted on plate 18, that is used for supplying motive force to the device, causing the tape 22 to be moved at the proper speed past the magnetic head 23 so that the message chosen to be recorded thereon can be automatically played for the caller at such time as he or she dials the number of this telephone, and so that other functions, described hereinafter, can be caused to take place. The motor 24 is preferably a 3-volt DC permanent magnet motor which produces approximately 0.250 inch-ounces of torque at 2500 rpm. The 3-voltDC power for the operation of the amplifier, the motor and a bell detector (explained later) is derived from a 3-volt DC power supply 104, located, but not illustrated, beneath the central plate.

The pinion 26 of the electric motor 24 is arranged to drive a rubber roller 28 affixed to a worm shaft 29, upon which a worm 30 is also affixed. The worm 30 is in mesh with a worm wheel 32, which is mounted upon a vertical shaft 34 that is rotatably disposed between the central plate 18 and the upper plate 20. On the lower end of the shaft 34 is a small spur gear 36 that is disposed closely adjacent central timing gear 40, only a portion of which is visible in FIG. 2.

Figure 5:
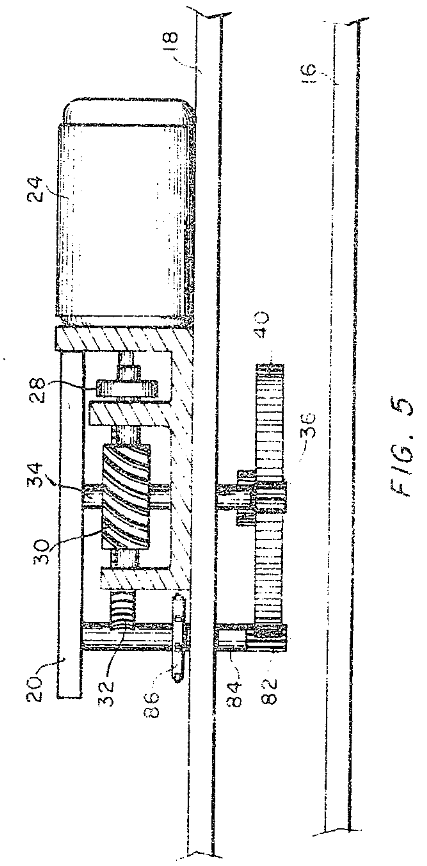
FIG. 5 is a rear view of the motor, gear and sprocket relationships.
Figure 4:
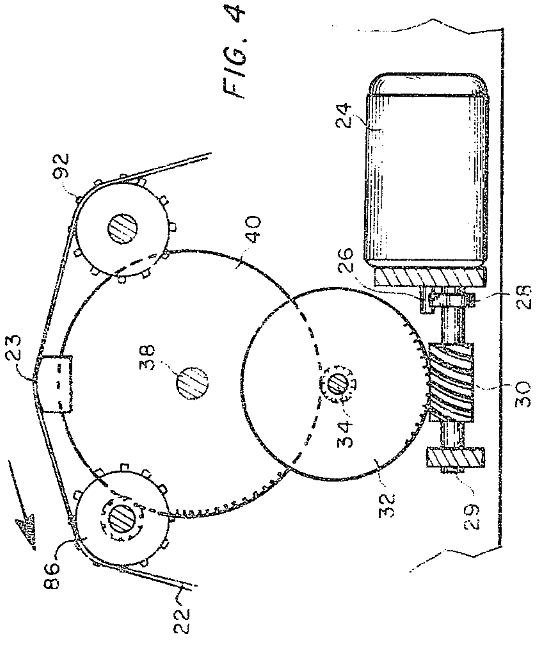
FIG. 4 is a top view of the motor, gear train, central timing gear and tape propelling means.

The central timing gear, best seen in FIGS. 3–5 is fixed on rotatable shaft 38 on the underside of central plate 18 and is provided with teeth entirely around its periphery. The small gear 36 is in continuous mesh with the teeth of the central timing gear and thus supplies the power for causing a proper rotation of the central timing gear. The rate of rotation can for an example be 1 rpm. From the central timing gear is derived the rotation for driving the tape 22 past the magnetic head 23, for "answering" the telephone, and for bringing about the other functions and events hereinafter described. The cam 40 is referred to as a central timing gear because the cam, in a sense, "times" the operation of the entire device. The central timing gear 40 makes one revolution for each operational cycle of the device, and causes the other portions of the device to be synchronized since each are positively controlled in one way or another by the "central timing gear." Inasmuch as the central timing gear 40 is a particularly important component of this device, it will now be described at some length.

Figure 6B:
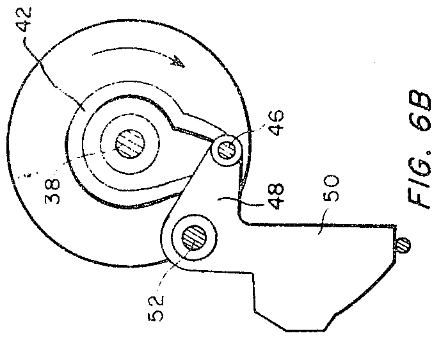
FIG. 6A and 6B are top views of the central timing gear and rotating follower, showing these components in two significant positions.
Figure 6A:
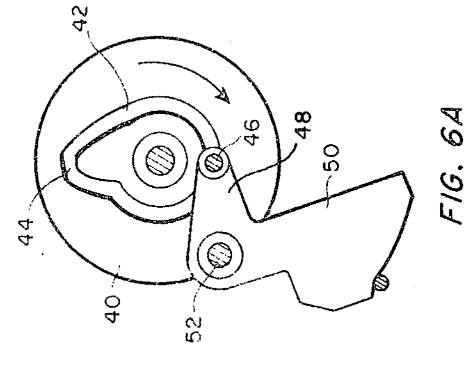

Disposed upon the upper surface of the central timing gear 40 nearest the central plate 18 is a generally circular groove 42, which groove is concentric with gear 40 except for a small lobe 44; see FIGS. 6A and 6B. Arranged to ride in groove 42 throughout the rotation of central timing gear 40 is a pin 46, which is secured in an arm portion 48 of rotating follower 50, principally visible in FIG. 3. The rotating follower is disposed just below central plate 18 and above the central timing gear 40, and is mounted upon shaft 52 as revealed in FIGS. 3, 6 and 7. Shaft 52 extends between central plate 18 and upper plate 20, and is rotatable through approximately 30 degrees as the pin moves from the concentric portion of the groove 42 to the lobe portion 44, to cause movement of the rotating follower 50. Note from FIGS. 6 and 8 that the rotating follower has turned in the clockwise direction as viewed from above as the pin 46 moves from the concentric portion of the groove 42 into the lobe portion 44 as the central timing gear turns.

The opposite end of the rotating follower 50 from the pin 46 forms a cam portion 54, in contact with which is a pin 56 that is rigidly mounted in play block 60; note FIGS. 3, 6, 7 and 9. The play block 60 is mounted to slide forwardly and rearwardly on a rail 62 on the upper surface of lower plate 16 in order to bring about the function of operating the play switch 64; see FIG. 9. These items will be hereinafter described in greater detail.

Figure 7:
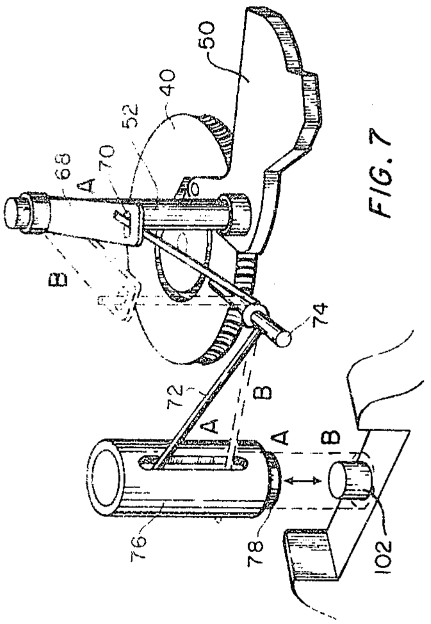
FIG. 7 shows the relationship of the rotating follower to the telephone disconnect button operating means.

Referring to FIGS. 3 and 7, it will be noted that the rotatable shaft 52 upon which the rotating follower 50 is mounted is provided with an arm 68 that is of course rotatable the same number of degrees as the rotating follower 50, which follower is caused to rotate as a result of its pin 46 following the contours of groove 42. The arm 68 is provided with a slot 70 in which one end of a crank member 72 is located. The crank member 72 is rotatably mounted upon a horizontally disposed capstan 74, with the other arm or end of the crank member extending through two vertical, diametrically opposed slots in a vertical tube 76. Located inside the tube 76, and also pierced by crank 72 is a vertically movable plunger 78. Thus, as the arm 68 is caused by the rotating follower 50 to swing back and forth, it causes commensurate rotation of the crank member 72 about the capstan 74, thus bringing about vertical movements of the plunger 78. As will be noted from FIG. 7, it is movement of the plunger that brings about the answering of the telephone and thereafter the "hanging up" of the telephone after the tape has been caused to run so as to deliver its message. The answering and hanging up of the telephone is accomplished by the plunger 78 by virtue of its being located directly above the disconnect button 102 of the telephone receiver. The plunger protrudes through a hole in the bottom of cover member 13, and is properly positioned to encounter the telephone disconnect button 102 by the contoured configuration of the cover 13, and the placement of the hole through which plunger 78 protrudes.

Returning to FIGS. 3-5, it will be noted that a small spur gear 82 is also in mesh with the teeth of the central timing gear 40, which gear 82 is mounted upon a rotatable shaft 84 connected to drive sprocket 86. The drive sprocket 86 is disposed above plate 18 and is equipped with a plurality of spaced teeth 88 arranged to mesh with the holes in tape 22, and thus to function to drive the tape through the machine at the desired speed, and to maintain the tape's relationship with the other movable parts making up the device 10.

FIG. 3 in particular reveals, in addition to the sprocket 86, a drag sprocket 92 over which the tape 22 passes before reaching the drive sprocket. The drag sprocket is prevented by a wire spring (not shown) from rotating freely, with the friction of this spring causing the tape 22 to be pulled taut between the two sprockets as it passes by the magnetic head 23. As will be explained hereinafter, the head 23 is used for both recording and playback.

The length of the belt of magnetic tape 22 is made to be such that one complete cycle of the band past the magnetic head 23 occurs during one rotation of the central timing gear 40. This is possible owing to the fixed ratios of the diameters of the central timing gear and the tape drive pinion 82, and the number of teeth on the drive sprocket and the tape band perforations. Thus, for any given orientation of the central timing gear, a particular portion of the tape band is passing the poles of the magnetic head. Hence, at the end of one complete passage of the tape past the head, the central timing gear has returned to the starting position.

Figure 8:
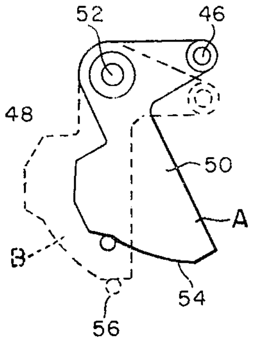
FIG. 8 shows the relationship between the cam portion of the rotating follower, and the play block pin.
Figure 9:
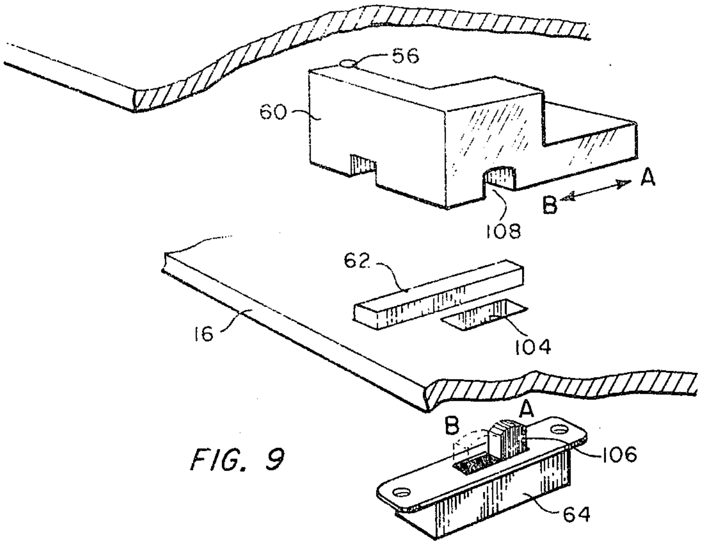
FIG. 9 is an exploded view of the play block and play switch assembly.

Referring to FIG. 8, and also to FIGS. 6A and 6B, it will be noted that the rotating follower 50 is movable between an operative position, indicated as position A, and a stand-by position, indicated as position B, these positions being brought about by movements of the pin 46 along the concentric portion of the groove 42, and thereafter the movement of this pin into the lobe portion 44, respectively. As previously indicated the portion 54 of the rotating follower 50, remote from the pin 46 is regardable as a cam portion, for with regard to the pin 56 associated with the play block 60, the edge of the portion 54 is at an ever-changing radius with respect to the shaft 52 with which the rotating follower rotates. Thus, when the rotating follower 50 is in the standby position B shown in FIGS. 8 and 6B, the play block 60 is at the farthest distance from the shaft 52, or in its rearward location. Note also FIG. 9. In contrast, when the pin 46 has been allowed to move into the concentric portion of groove 42 as a result of rotation of gear 40, the block 60 is allowed to slide forwardly under a spring bias, which is to the right as viewed in FIG. 9. For clarity, it should be noted at this point that the pin 56 is used simply as a hard bearing surface and should be regarded as a part of the play block. The block 60 may be constructed of plastic and would suffer from excessive wear if it were allowed to bear against the rotating follower. The play block remains in this forward position A until such time as the central timing gear 40 has again rotated to the position in which the lobe 44 of groove 42 causes the play block to return rearwardly to standby position B.

The preferred spring bias for the play block 60 is provided by the play switch 64, which is mounted below the lower plate 16 at a location directly below a slot 104, with the movable portion or operator 106 of the switch 64 extending through this slot, and extending into a cavity 108 on the underside of the play block 60. Note FIG. 9. Thus, when the cam portion 54 of the rotating follower 50 in effect moves away from the play block, or in other words moves into the position shown in FIG. 6A, the play block follows from position B to position A under the influence of the spring-loaded switch, with the switch thus being allowed to move from the standby position to the operating or play position. FIG. 6A, the play block follows from position B to position A under the influence of the spring-loaded switch, with the switch thus being allowed to move from the standby position to the operating or play position.

When the play switch is moved from the rearward, standby, position to the forward, play, position it switches the device into the play mode of operation. A more detailed explanation will be given later of the electrical operation of the device, but at this point it is sufficient to state that in the play mode the device operates as an ordinary tape recorder being used to play back a previously recorded message.

Figure 11:
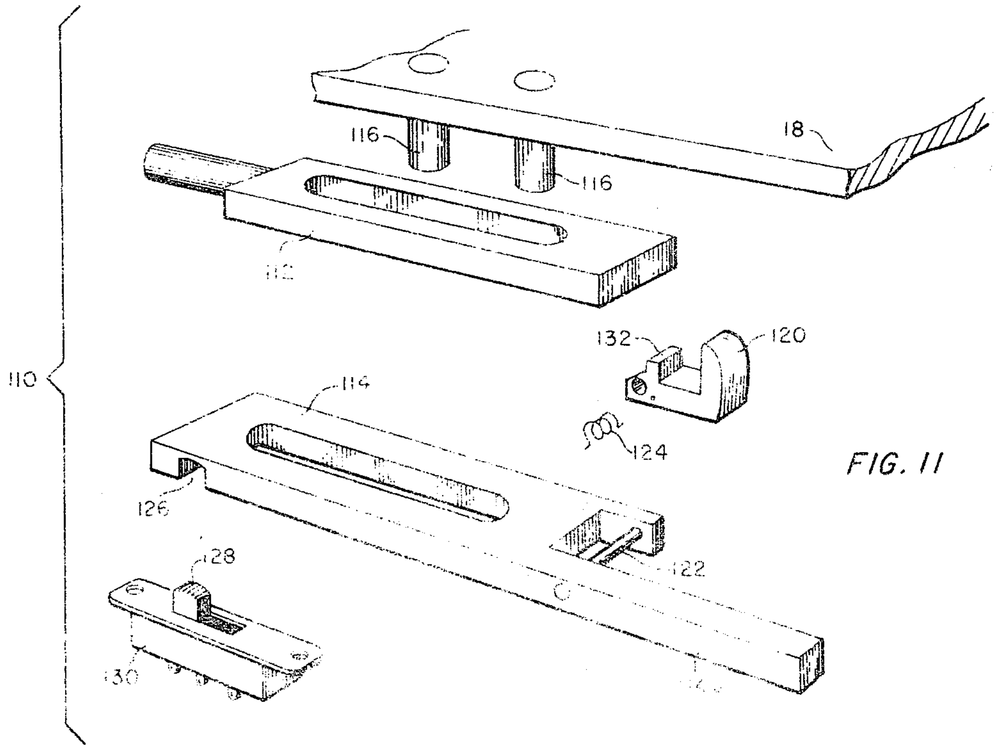
FIG. 11 is an exploded view of the record assembly.

Turning to FIGS. 11 and 12, it will be noted that I have shown in FIG. 12, the record assembly 110 in five operative positions. The record assembly is operated when the user wishes to change the message on the tape 22, and comprises, as shown in FIG. 11, a pusher member 112 and a slider member 114, which are relatively movable slotted members disposed upon spaced posts 116 mounted on the underside of the central plate 18 near the rear of the device; see also FIG. 12.

As shown in FIG. 11, rotatable dog 120 is mounted on a short transverse shaft 122 mounted on the slider member 114, which dog is rotatable under the influence of a torsion spring 124 between the positions illustrated in FIG. 13 for a purpose soon to be described. In FIG. 11, as well as in FIG. 3, on the opposite end of the slider member 114 from the dog is shown a slot or recess 126 in which is disposed the movable portion or operator 128 of the record switch 130. Thus, when the user of the device properly manipulates the record assembly 110, that is, depresses the pusher, this has the result of operating the record switch, 130, which places the device in the record mode of operation, so that a new recording can be placed upon the endless magnetic tape 22.

In FIG. 12, returning to the pusher member 112 and the slider member 114, the pusher member is normally prevented from moving inwardly by the presence of the dog 120, and the dog is resting against the edge of the rotating follower 50, preventing the entire record assembly from moving. However, when the pusher member 112 is pushed inwardly with sufficient force, it acts against the foot portion 132 of the dog 120, causing the dog to rotate downwardly against the bias of torsion spring 124 into the downward position, in which it can clear the rotating follower 50 and the entire record assembly may be pushed inwardly. At this point the portion 114*a* of the slider can pass in front of the play block 60, preventing it from moving (and thus preventing the play switch from operating during record), and the portion of the slider containing the slot 126 can move with respect to the base of the record switch 130 so as to move it into the record position, such that a new message can now be placed on the tape 22.

With the device in the record mode, it is connected to operate as an ordinary tape recorder while a new recording is being made; the microphone output is amplified and fed to the magnetic head which imprints it on the passing tape. When the force of the user's finger has been removed from the pusher, the dog 120, under the influence of the torsion spring, comes to rest against the bottom surface of the rotating follower the significance of which will be explained hereinafter.

The movement of the record switch 130 to its operative position causes the motor 24 to operate, thus to cause rotation of the central timing gear 40 and bring about the rotation of the rotating follower 50 to its operative position A. Upon such movement of the rotating follower, the spring-loaded dog 120 is allowed to come to rest against the underside of the central plate 18 in the place just vacated by the rotating follower. As the operating cycle nears its end, the rotating follower 50 is then caused to rotate back to its standby position B. In assuming this position, it encounters the dog 129, which, as explained above, which is now located in part of the space vacated by the follower when it moved from the standby position to the operate position at the beginning of the cycle. The follower pushes the dog and hence the entire record assembly out of its way, and causes the switch actuating mechanism to slide back to its initial standby position, the pusher 112 of course being caused by the foot portion 132 of the dog to return to its conspicuous position, thus informing the user that the record cycle has been completed. This also brings about a retraction of the extension 114*a* of the slider, thereby allowing the play block 60 to move forward again, at the appropriate time. The relationship between the extension 114*a* of the slider and the play block 60 can be further understood by studying FIGS. 11 and 3.

As will be obvious, when a new recording is to be made, it it first necessary to erase the old message. FIG. 3 shows that this is brought about by bringing a small permanent magnet 140 into proximity with the magnetic tape 22 as the tape passes between the drag sprocket 92 and the magnetic head 23. This movement is brought about as a result of motion of an upstanding pin 113 on the upper surface of the pusher member 112. This pin 113 extends through a slot in the central plate and engages a crank 144 which rotates on a capstan 146. The other end of the crank is attached to a link 150. The other end of link 150 is attached to a crank 152, as when the pin 113 moves from left to right as viewed in FIG. 3, the crank member 144 is caused to rotate counter-clockwise, and thus cause by virtue of clockwise movement of the arm 152, the magnet 140 to be brought into a position close by the tape 22 to accomplish an erasing of same.

Another embodiment of the mechanical portion of the answering device of the present invention will be described with reference to FIG. 13. In this embodiment, the answering device is electrically similar to the previous embodiment and includes a mechanical sub-assembly as described next.

Noting FIG. 13 the mechanical sub-assembly, referred to generally as 200, includes a main plate 202 similar to the central plate 18 shown in FIGS. 2, 5, 9 and 11. FIG. 13 is oriented such that the viewer is observing the top of the main plate 202, the bottom considered to be positioned towards the telephone receiver. Thus, reference hereinafter to "downward" refers to components mounted below the main plate 202 (and away from the viewer), while "upward" refers to components mounted above the main plate.

Noting FIG. 13, a pinion 204 extends downward through the main plate 202, the pinion being mounted on a shaft 206 which is driven by a motor 208 mounted above the plate. A cam is rotatably mounted on a fixed shaft 212 extending downward normal to the main plate 202. A gear 214 is rotatably mounted on the same shaft 212 as the cam 210 and rotates with the cam, and is positioned below the cam and the main plate 202, with the gear in mesh with the pinion 204. The cam 210 also functions as a central timing gear, as previously described with reference to the cam 40.

The cam 210 is generally circular except for a single extension 216 along a minor portion of the periphery thereof. A cam follower 218 is rotatably mounted on a downwardly extending fixed shaft 220 adjacent to the cam 210, and includes a follower arm 222 and a beveled cam surface 224. In addition, the cam follower 218 includes a ramp-shaped indentation 226 along its periphery and just opposite the cam 210. Spring biasing means (not shown) biases the cam follower arm 222 in a clockwise direction around the shaft 220.

An L-shaped arm 228 is rotatably mounted above the main plate 202 on an upwardly extending fixed shaft 230 mounted normal to the main plate. The arm 228 is spring-biased by a spring (not shown) in a counterclockwise direction around the shaft 230. The L-shaped arm 228 includes a pin 232 at one extremity thereof, the pin 232 extending through the plate 202 with the arm 228 and shaft 230 being positioned such that the pin 232 bears against the cam surface 224. The other extremity of the arm 228 includes a V-shaped fork 234. An endless tape play switch 236 extends through the main plate 202 such that the mechanical switch element 238 extends upwardly and is interposed between the extremities of the forked end 234.

The L-shaped arm 228 further includes an inward extension 240 positioned between the shaft 230 and the forked end 234. The extremity of the inward extension 240 bears against an upwardly extending portion 242 of a rotatable bell crank 244, which is shown in greater detail at the inset of FIG. 13*a*. The bell crank 244 is rotatable around the shaft 246, and includes a pivoted plate 248, the end of which is adapted to bear against the top of one of the receiver buttons 250 of the telephone.

Referring again to the pinion 204, a gear 252 is fixed with the pinion on the shaft 206. A sprocket gear 254 is mounted on a rotatable shaft 256, which extends both above and below the plate. The sprocket gear 254 is fixed on the shaft 256 with a sprocket 258 (above the main plate 202) and a circular tire 260 (above the sprocket 258). The tire 260 has a frictional surface 262 along the periphery thereof.

A bearing 264 is rotatably mounted on an upwardly extending shaft 266 and in engagement with the frictional surface 262 of the tire 260. A flywheel 268 is fixed to the bearing 264 on the shaft 266.

Noting the upper-left hand portion of FIG. 13, a flat interlock arm 270 is slidably fixed on two guideposts 272, 274. The interlock arm 270 is disposed adjacent to and parallel with the undersurface of the main plate 202. The interlock arm 270 includes an opening 276 which receives the downwardly extending mechanical switching element 278 of a tape record switch 280. In this embodiment, the interlock arm 270 includes two parallel extremities 282, 284, one of which (element 282) bears against the pin 232 located at the extremity of the L-shaped arm 228, and the other of which extremity 284 bears against a downwardly extending post 286 joined to the cam follower arm 222.

An arm 288 rotatably mounted on a downwardly extending fixed shaft 290 is pivotably fixed at one extremity with the interlock arm 270 by a pivot post 292. A rod 294 is connected at one end to the other extremity of the arm 288 and at the other end to a crank 296. The crank 296 is fixed to a rotatable shaft 300 which extends upward through the plate 202 and to a capstan 298 above the plate 202 and under the flywheel 268. The capstan 298 includes a permanent magnet 302 fixed at a point on the periphery thereof. An endless, perforated tape 304 similar to that previously described extends around the capstan 298 and the sprocket 258 and across a record-playback magnetic head 306.

The operation of the embodiment shown in FIG. 13 will now be described. Initially the ringing of the telephone instrument is picked up by the microphone, amplified and then fed to a trigger circuit which intermittently operates the motor upon each ring impulse (this electrical operation will be described with reference to FIG. 10). Successive intermittent operation of the motor causes the cam 210 to rotate clockwise, which in turn allows the cam follower 218 to rotate in the same direction, caused by the outward extension 216 in the cam 210 passing under the ramp-shaped indentation 226 in the follower. The cam follower 218 is spring-biased in a clockwise direction and during rotation thereof the cam surface 224 allows the pin 232 to move in agreement with the arrow thereby allowing the L-shaped arm to rotate on shaft 230 in a counterclockwise direction.

Counterclockwise movement of the L-shaped arm 228 causes the forked extremity 234 to move the play switch to the play position. As further described with reference to FIG. 10, operation of the play switch disconnects the trigger circuit and switches the motor continuously on. As will be described in greater detail, a remote independent tape recorder may also be switched on by operation of the play switch 236.

The counterclockwise movement of the L-shaped arm 228 also causes the inward extension 240 to bear away from the portion 242 of the bell crank 244, which in turn allows the telephone receiver button 250 to be released upwardly.

After the play switch 236 is switched on, the motor is operated continuously, causing the cam 210 to be driven through one revolution. Simultaneously, the gear 252 rotatably fixed with the pinion 204 drives the sprocket gear 254. This in turn causes the sprocket 258 to pull the magnetic tape 304 across the record-playback head 306. The flywheel 268 is driven by the frictional surface of the tire 260, the flywheel providing a rotational stabilizing inertia. As the tape 304 travels across the magnetic head 306, a message is imparted to the mouthpiece of the handset, this message having been previously recorded on the tape.

The cam 210 completes its rotation, thereby disposing the upward extension 216 in the ramp-shaped indentation 226, which in turn causes the cam follower to lift the L-shaped arm 228 and return the play switch 236 to the off position. The inward extension 240 of the L-shaped arm 228 also moves in an inward direction against the portion 242 of the bell crank 244, thereby depressing the receiver button of the telephone instrument. It will be noted at this point that the endless magnetic tape 304 has a predetermined length corresponding to the circumference of the cam 210 such that a single rotation of the cam results in a complete revolution of the tape.

The interlock arm 270 functions to interlock the operation of the record switch 280 and the play switch 236 such that both switches cannot be operated simultaneously. When the interlock arm 270 is manually urged at 308 in the direction of the arrow, the extension 282 slides next to pin 232 thereby preventing the L-shaped arm 228 from rotating counterclockwise and operating the play switch 236. This movement of the interlock arm 270 takes place in the following manner: pressure at point 308 is resisted at extremity 284 where the arm is resting against post 286 on the cam follower arm 222. Flexure at the narrow portion 307 of the interlock arm allows the portion of the interlock arm between points 308 and 284 to rotate clockwise, by virtue of the relatively small section thereat. This bending or rotation causes extremity 284 to move to the side of the post 286, clearing the post 286 of the cam follower arm 222. When this occurs the interlock arm 270 is allowed to slide in the direction of the arrow 308. This sliding shifts the mechanical switching element of record switch 280 into the record position, enabling voice program to be placed on the tape 304. This sideward movement of the interlock arm 270 also causes a clockwise rotation of the erase arm 288, which in turn slides rod 294 sideward, which rotates crank 296 clockwise, and causes the capstan 298 to do likewise. This places permanent magnet 302 against the tape 304, erasing all previous messages therefrom before it passes the head 306.

The operation of the record switch 280, in addition to connecting the system elements for proper recording, switches the motor on, causing the tape 304 to be propelled and also causing the cam 210 to rotate as before. This allows the cam follower to rotate clockwise and causes post 286 to rotate clear (to the right) of extension 284 of interlock arm 270. Near the completion of the cycle, when cam 210 has made almost a complete revolution, cam follower 222 begins rotating counterclockwise and post 286 encounters the extension 284, causing interlock arm 270 to slide back toward its original position. This movement is not sufficient to move switch 280 back to the standby position however, and the motor remains on while the cam follower arm 222 rotates to its fully upward position (shown) and then begins clockwise movement. At this point the interlock arm 270 is positioned such that the bevelled corner of extension 282 is directly below the pin 232 of the L-shaped arm 228. As the pin 232 moves down the cam surface 224 under the influence of the counterclockwise spring torque of the arm 228, causes the interlock arm 270 to slide further toward the original position and switches the record switch 280 back to its original position. This occurs, however, after the L-shaped arm 228 has rotated far enough to operate play switch 236, causing the motor to continue to run. The effect of this is to automatically "audition" the just-recorded message, at the end of which the device automatically stops, as before.

The description up to this point has covered the mechanical portions of the device and has explained how the motor is used to drive the central timing gear or cam and how the other mechanical parts of the device are controlled and energized thereby; and also how, through the action of these mechanical parts and assemblies, the electrical portions of the device are controlled through the operation of slide switches and the telephone disconnect switch button. The next portion of the description is devoted to the electrical components and how they interrelate.

Figure 10:
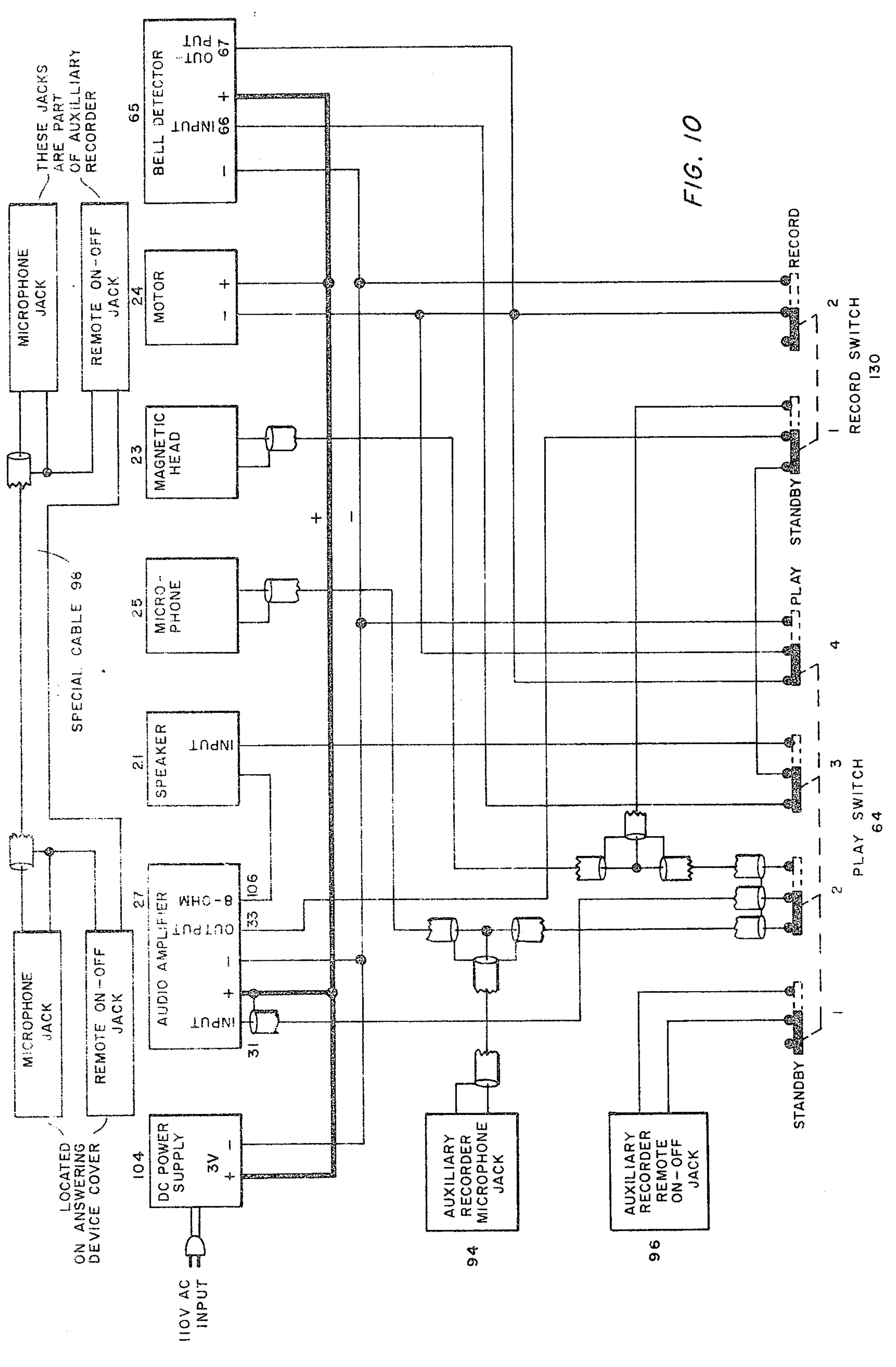
FIG. 10 is a schematic block diagram of the electrical components of the device, which shows how they are controlled by the mechanical switching.

Beginning in the upper left-hand corner of FIG. 10 it can be seen that input power is derived from a 110 Vac source and is converted to 3 Vdc by the power supply 104. This is a solid state supply consisting of a transformer whose center-tapped secondary winding is bridge-rectified and filtered. It supplies electrical power to the amplifier 27, the motor 24, and the bell detector 65. The positive terminal of the power supply is treated as the ground connection for the entire electrical system of the device.

The amplifier 27 is a 4-stage solid-state audio amplifier, whose input impedance is suitable to be used by either the microphone 25 or the magnetic head 23. A potentiometer 108 (not illustrated) is provided to adjust the amplifier gain. The amplifier output 33 is used to drive either: (1) the speaker 21; (2) the magnetic head 23; and (3) the bell detector 65. The input impedances of the magnetic head and the bell detector are similar and are much higher than the low speaker impedance, and when the amplifier output is connected to these components, the return connection is made directly to the positive terminal. However, when the amplifier output is driving the speaker, the return is made through the point 106 marked 8-ohm. Since this point is used only to drive the speaker it is connected there permanently.

The speaker 21 is an ordinary permanent magnet speaker having, for example, an 8-ohm input impedance. The microphone 25 is also an ordinary carbon microphone. Both components may be of the type commonly used with inexpensive tape recorders. The characteristics of the motor were given earlier.

The bell detector 65 is an ordinary transistor switch whose base is fed by a diode rectifier and R-C filter network. The filter network provides a DC output proportional to the average value of the AC signal at the input, and when this DC output is of sufficient amplitude causes the transistor switch to conduct. It is termed a bell detector because it is used to detect the occurrence of the telephone bell sound, and the RC product is chosen to make the filter most sensitive to the bell frequency. However, since the bell frequencies differ from instrument to instrument, this selection is very broad.

The record switch 130 and the play switch 65, as described earlier are ordinary multi-poled double-throw slide switches.

The auxiliary recorder remote on-off jack 96 and auxiliary recorder microphone jack 94 are located on the outside cover of the device and are used to connect the device to an auxiliary recorder for recording the callers' messages. This is accomplished through the use of special cable 98 as shown schematically in the lower portion of FIG. 10, and pictorially in FIG. 1.

The auxiliary recorder is not a part of this invention and is not covered in this description except to say that it must be of the type that has a remote on-off feature.

This feature amounts to having a jack on its panel into which is inserted a plug which connects to a switch, usually located on the recorder microphone handle, and allows the operator to start and stop the recorder by operating the switch. When the auxiliary recorder is used with this telephone answering device, one end of the cable 98 is plugged into the remote on-off jack and the microphone jack of the auxiliary recorder, and the other end of the cable is plugged into the jacks 94 and 96 of the answering device. In this manner my answering device can then turn the auxiliary recorder on and off and the microphone in my answering device can be used for recording with the auxiliary recorder; note FIG. 10.

The telephone answering device has three modes of operation: (1) standby mode; (2) record mode; and (3) play mode. FIG. 10 shows the device in the standby mode, and this mode is defined as the condition when both the play switch and the record switch are in the standby positions. As explained earlier, the mechanical interrelationship of the record assembly and the playback is such that the record and play switches are mutually exclusive. Each of the three operational modes is explained below:

*a.* Standby Mode. In this mode both the play switch and the record switch are in the retracted or standby positions. The orientation of the central timing gear is such that the pin 46 of the rotating follower is at the top of the lobe 44 or groove 42, the plunger is extended and is depressing the telephone button 102, and the magnetic tape band is at the starting point (which is also the stopping point). The amplifier input is connected to the microphone, the amplifier output is connected to the bell detector input and the bell detector output is connected to the motor. In this manner, when the telephone rings the sound of the bell is converted to electrical signals by the microphone and amplified by the amplifier, the output of which triggers the bell detector which temporarily conducts the power supply output to the motor, causing it to run for the duration of the ring. Running the motor causes the central timing gear to rotate, which, through the action of the rotating follower, allows the playback and play switch to slide forward, and simultaneously causes the plunger to begin lifting. After a sufficient number (1 or 2) of rings, the motor has run long enough to lift the plunger completely and allow the play switch to slide to the forward on play position and place the answering device in the play mode.

*b.* Play Mode. The dashed portions of the play switch contacts show the condition of the device in the play mode. Pole 1 shorts the contacts of the auxiliary recorder on-off circuit, causing the recorder to run. The second pole switches the amplifier input from the microphone to the magnetic head. Pole 3 switches the amplifier output from the bell detector to the speaker, and pole 4 switches the motor from the bell detector output to the power supply output. The effects of the above actions are to cause the motor to run continuously, for the duration of the cycle, transporting the magnetic tape past the magnetic head. The output from the head is amplified and used to drive the speaker, which due to the geometrical configuration of the answering device, is located adjacent to the telephone mouthpiece. This causes a previously recorded message contained on the tape to be transmitted to the caller.

Also, the microphone, by virtue of the same geometry is located close to the telephone earpiece, and any message spoken by the caller is detected by the microphone and fed via the special cable 98 to the auxiliary recorder which is caused to run during the play mode of operation.

The above condition is maintained for the approximate 1-minute operational cycle of the device, until, as explained earlier, the central timing gear and therefore the magnetic tape band have made one complete revolution or cycle, and the device automatically returns to the standby mode, turning off the auxiliary recorder, and awaiting the next call.

This sequence is repeated each time the bell rings until the owner or user of the device returns and removes the device from the telephone. Upon returning, the user then may rewind the auxiliary recorder and listen to the messages, if any, left by callers.

*c.* Record Mode. The record mode of operation is used whenever a new recording is to be placed on the magnetic tape band. As explained earlier, the device must be in the standby condition when entering the record mode, and this entering is accomplished by simply pressing the protrusion of the pusher 112 inward. This causes the dog 120 to rotate and allows the record assembly to slide inward, moving the record switch contacts to the dashed position. Pole 1 switches the amplifier output from the bell detector input to the magnetic head, and pole No. 2 connects the motor directly to the power supply output, causing the motor to run and transport the tape past the magnetic head. In this condition, a message spoken into the microphone which is connected to the amplifier input is amplified and is recorded by the head onto the tape. At the end of the 1-minute cycle, the cycle assembly, and hence the record switch is returned automatically to the standby position. As explained earlier, the tape is erased just prior to passing the head.

I claim:

1. In a telephone answering device of the type adapted for use with a telephone instrument having a receiver and a handset, the combination comprising:

a rotatable indexing cam;

a rotatable sprocket;

means mechanically coupling said indexing cam with said sprocket without slippage therebetween;

an endless belt of a recording medium, said belt including a plurality of spaced sprocket holes therein engaged by said sprocket;

means including a playback head for playing back information recorded on said belt into said handset;

means including said sprocket and rotatable with said cam for driving said recording belt past said playback head; and wherein the length of said belt corresponds to a predetermined indexing portion of the periphery of said indexing cam, such that rotation of said predetermined indexing portion of said indexing cam causes a complete cycle of said belt past said playback head.

2. Apparatus as recited in claim 1 wherein said belt and said cam are dimensioned and disposed such that said belt completes one cycle for each complete rotation of said cam.

3. Apparatus as recited in claim 1 further comprising means mechanically coupled with said cam for automatically stopping said drive means after rotation of said predetermined portion of said cam.

4. Apparatus as recited in claim 1 further comprising means coupled to said cam for initiating said drive means.

5. Apparatus as recited in claim 4 further comprising:

means for recording information on said belt;

means for switching off said playback means during operation of said recording means;

means mechanically coupled to said initiating means for simultaneously operating said initiating means and said recording means;

means for erasing said information on said belt prior to passage across said recording means; and means for automatically operating said playback means at the end of a cycle of said recording means.

6. Apparatus as recited in claim 4 wherein said telephone receiver includes a receiver button, said device further comprising means mechanically coupled with said initiating means to said cam for releasing said receiver button during rotation of said cam.

7. Apparatus as recited in claim 4 wherein said mechanical initiating means comprises a cam follower in contact with said cam, said cam further comprising means for moving said cam follower only at a predetermined location of the rotation of said cam.

8. Apparatus as recited in claim 7 wherein said cam follower moving means comprises a generally concentric groove with an outwardly extending opening, the periphery of said opening communicating with the periphery of said groove.

9. Apparatus as recited in claim 7 wherein said cam follower moving means comprises a lobe extending outwardly from the periphery of said cam.

10. Apparatus as recited in claim 9 wherein said cam follower comprises an indentation along a portion of the periphery thereof, said indented portion adapted to engage said lobe.

11. Apparatus as recited in claim 10 wherein said telephone instrument comprises audible signalling means, said device further comprising means for intermittently rotating said cam in said indentation only during said audible signals.

12. Apparatus as recited in claim 11 wherein said intermittent rotating means comprises:

a motor having a shaft mechanically coupled with said cam for imparting rotation thereto; and a bell detector circuit for detecting said audible signals and intermittently energizing said motor responsive thereto.

13. Telephone answering and recording apparatus adapted for use with a standard telephone instrument of the type having a receiver, a receiver button, a handset, and an audible signalling means associated therewith, said apparatus comprising:

a housing adapted to rest adjacent said telephone receiver, said housing including an opening of sufficient dimensions such that said receiver button of said telephone receiver can extend into said opening;

means for alternately holding and releasing said receiver button;

said housing further including means for cradling said handset of said telephone instrument;

means with said cradling means for delivering audible signals to the mouthpiece of said handset;

a recording medium in said housing;
means in said housing for playing back information on said recording medium to said delivering means;
means automatically responsive to audible signals from said audible signalling means for initiating said playback means, said playback initiating means comprising:
a motor;
means coupled to said motor electrically responsive to said audible signalling means for intermittently operating said motor during each audible signal;
a rotatable cam mechanically coupled to said motor;
an electrical switch for fully energizing and stopping said motor;
a spring biased rotatable actuating arm engaging said electrical switch; and
means for preventing rotation of said actuating arm prior to said predetermined amount of rotation of said cam; and
means coupled with said playback initiating means for simultaneously causing said receiver button holding means to release said receiver button.

14. Apparatus as recited in claim 13 wherein said preventing means comprises:
a rotatable cam follower having an indented surface bearing against an outward extension of said cam so as to prevent rotation of said follower until subsequent to movement of said extension away from said indented surface; and
said actuating arm bearing against the cam follower such that said actuating arm is only rotatable upon rotation of said follower.

15. Apparatus as recited in claim 14 wherein said receiver button holding and releasing means comprises a bell crank, and wherein said means mechanically coupled with said playback initiating means comprises said bell crank operated by said actuating arm.

* * * * *